United States Patent [19]
Yilmaz

[11] Patent Number: 5,918,277
[45] Date of Patent: Jun. 29, 1999

[54] APPARATUS FOR MEASURING DIRECTIONAL RAINFALL OR SNOW

[76] Inventor: G. George Yilmaz, 28202 Meadowlark La., Bonita Springs, Fla. 34134

[21] Appl. No.: 08/905,125

[22] Filed: Aug. 1, 1997

[51] Int. Cl.[6] .............................. G01W 1/00; A63B 53/00
[52] U.S. Cl. ...................................... 73/170.17; 73/170.05
[58] Field of Search ........................... 73/170.05, 170.07, 73/170.11, 170.17

[56] References Cited

U.S. PATENT DOCUMENTS

| 916,060 | 3/1909 | Thomson | 73/170.17 |
|---|---|---|---|
| 1,407,068 | 2/1922 | Johnson | 73/170.05 X |
| 2,384,954 | 9/1945 | Moore | 73/170.17 |
| 2,570,710 | 10/1951 | Quinteros | 73/170.17 |
| 3,826,135 | 7/1974 | Hollman | 73/170.17 |
| 3,900,962 | 8/1975 | Chan | 73/170.05 X |
| 5,291,779 | 3/1994 | Govoni et al. | 73/170.17 |
| 5,531,114 | 7/1996 | Frager | 73/170.17 |

FOREIGN PATENT DOCUMENTS 504999   2/1976   U.S.S.R. .

Primary Examiner—Harshad Patel
Assistant Examiner—Robin C. Clark

[57] ABSTRACT

Present invention provides an apparatus for measuring directional rainfall or snow incorporating variables of a drainage basin including slope of topography and vertical barriers and direction of wind vector all of which are calibrated to the drainage basin. The apparatus includes an angular collection unit having a main angle and a secondary angle and a vertical capture plate adjusted at the height representative of vertical and a positioning unit which positions the angular collection unit in the direction of wind. Using the apparatus, rainfall or snowfall is measured as a function of basin topography and wind conditions eliminating a large number of rainfall and snowfall gauges for averaging purposes to obtain more representative and accurate measurements.

1 Claim, 2 Drawing Sheets

APPARATUS FOR MEASURING DIRECTIONAL RAINFALL OR SNOW

FIELD OF THE INVENTION

The present invention lies in the field of hydrology and more particularly to improve measurement of rainfall or snow under heavy directional winds.

BACKGROUND OF THE INVENTION

There is a need for an apparatus which improves the accuracy of rainfall measurements effected by wind. Said apparatus also makes rainfall measurements possible even under horizontal directional rainfall. Prior art for measuring rainfall events does not consider direction of winds effecting rainfall. In addition, prior art reviewed does not consider measurements of horizontal or near horizontal rainfall events. Present invention improves the accuracy of rainfall measurements effected by wind, and also makes angular and horizontal rainfall measurements possible.

SUMMARY OF THE INVENTION

The present invention lies in the field of hydrology and improves the accuracy of rainfall or snow measurements effected by wind. Said measurements are made possible even under horizontal directional rainfall or snow by the present invention. In nature rainfall has changing angular direction over a given large drainage basin which includes non flat topography and vertical obstructions such as trees, structures and roofs. Angular and horizontal rainfall or snow is captured by non flat topography and vertical obstacles of said drainage basin. A small collection surface of prior art does not capture all of the angular rainfall due to limitations of its fixed and flat collection surface. In addition, horizontal directional rainfall is not captured by prior art due to lack of vertical collection surface. Therefore, rainfall measured by prior art has an inherited margin of error due to its limitations.

Present invention incorporates primary variables of a drainage basin such as slope, vertical barriers, direction of wind all of which effect rainfall. If said variables incorporated in present invention are selected and calibrated site specifically to a drainage basin, a rainfall event can be modeled and recorded most accurately using present invention.

DETAILED DESCRIPTION OF THE PREFERRED EMBODIMENTS

Figure 1:
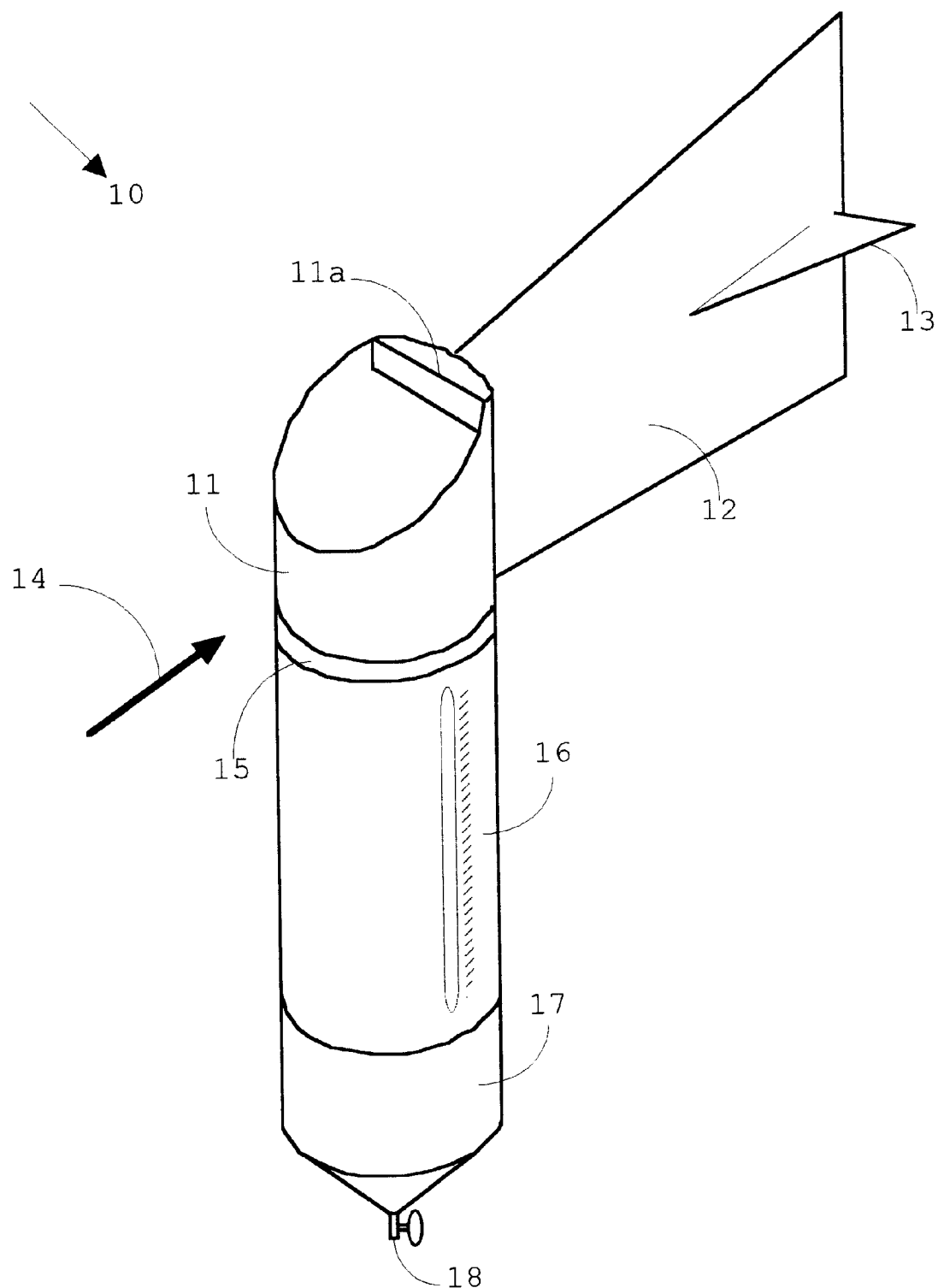
FIG. 1 shows a perspective view of the present invention including an angular collection unit, a positioning unit, a measurement unit, and a containment and discharge unit.

FIG. 1 shows a perspective view of the present invention including an angular collection unit 11, a positioning unit 12, a rotational connector 15, a measurement unit 16, and a containment and discharge unit 17, and a discharge valve 18. Said angular collection unit 11 is shown in the direction of wind vector 14 positioned by 12.

Figure 2:
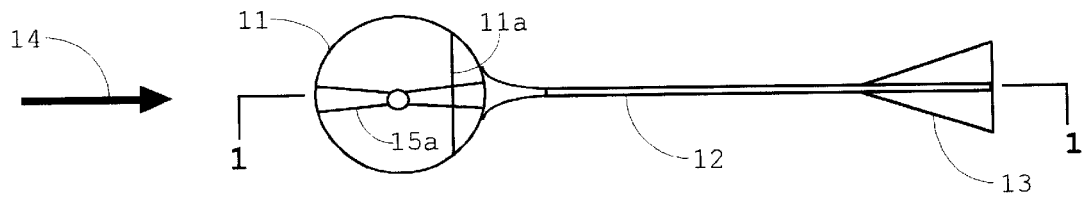
FIG. 2 shows a top view of the present invention including an angular collection unit, and a positioning unit.

FIG. 2 shows a top view of the present invention including an angular collection unit 11, a positioning unit 12 which is attached to angular collection unit 11. A pair of stabilizers 12.a are attached to positioning unit 12 to provide stability. A vertical capture plate 11.a is shown relative to direction of wind vector 14. FIG. 2 also shows a top view of a male joint 15.a of a rotational connector 15, and identifies cross section 1—1 as demonstrated in more detail in FIG. 3.

Figure 3:
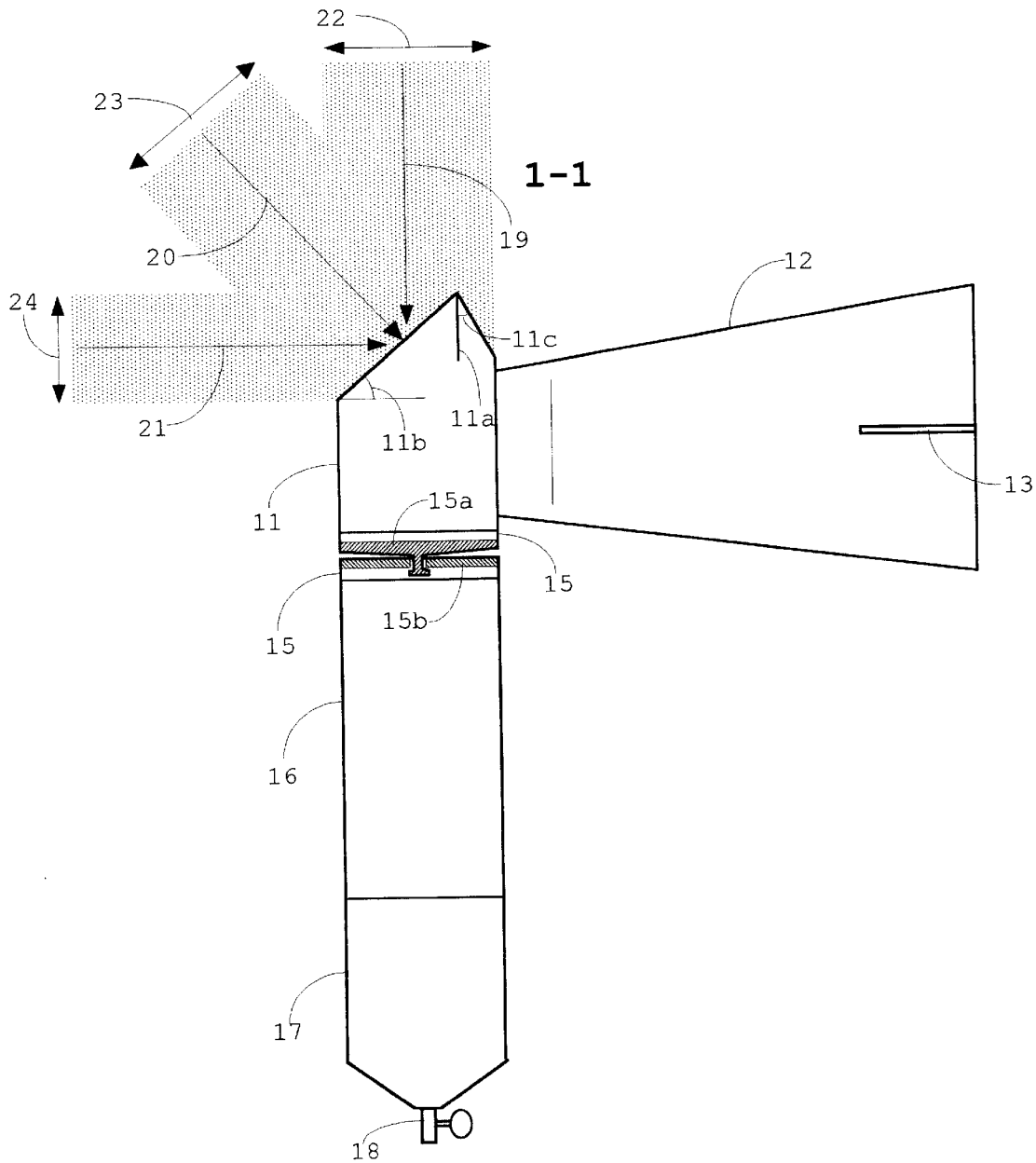
FIG. 3 shows a vertical cross section view 1—1 as shown in FIG. 2 of the present invention including an angular collection unit, a positioning unit, a rotational connector, a measurement unit, and a containment and discharge unit.

FIG. 3 shows a view of cross section 1—1 as shown in FIG. 2. An angular collection unit 11 is positioned by a positioning unit 12 in the direction of wind vector 14 using a rotational connector 15 which is attached to 11. Said angular collection unit has angles 11.b and 11.c, and vertical capture plate 11.a, all of which allow collection of vertical rainfall 19, angular rainfall 20, and horizontal rainfall 21 covering areas defined by 22, 23, 24 respectively. Angle 11.b is preferred to be 45 degrees and 11.c is preferred to be less than 45 degrees. Vertical capture plate 11.a is to cover opening created by angle 11.c to maximize collection of horizontal directional rainfall. However said angles and vertical capture plate can be selected to represent a specific drainage basin as a function of wind vector patterns and topography of said basin. Angular collection unit 11 is connected to a measurement unit 16 using rotational connector 15 which consist of male and female connectors 15.a and 15.b respectively. A containment and discharge unit 17 and discharge valve 18 are attached to said measurement unit. Containment and discharge unit 17 contains the rainfall water and discharges using 18 as needed. In nature, rainfall is directional and angular due to effects of local and regional winds over drainage basins which are not flat. All horizontal and angular rainfall is captured by non flat topography, and vertical obstacles such as structures, roofs, and vegetation including trees. Prior art commonly has a fixed horizontal collection surface which does not consider effects of wind on rainfall. When prior art is used where strong local and regional winds are present, measurements and associated data would not represent the actual rainfall over a drainage basin. There would be a significant deviation due to disparity between horizontal and angular rainfall measured versus actual rainfall captured by the drainage basin. However present invention has an angular collection unit 11 which is positioned by a positioning unit 12 in the direction of wind vector 14. An angular collection unit 11 has an angular surface defined by angles 11.b and 11.c, and vertical capture plate 11.a, all of which provide conditions representative of rainfall occurring and collected in nature. For instance, horizontal or near horizontal rainfall 21 through a cross section of space identified by 24 would be captured by the present invention, but would not be captured by prior art.

Present invention incorporates primary variables of a drainage basin such as slope of topography, vertical barriers, direction of wind vector, all of which effect rainfall collection. If said variables incorporated in present invention are selected and calibrated site specifically to a drainage basin, a rainfall event can be modeled and recorded most accurately using present invention.

While I have fully shown and described embodiments of my apparatus for measuring directional rainfall or snow no limitations as to the scope of the present invention should be implied from the foregoing description. The true scope of the present invention is limited only by the following claims.

I claim:

1. Apparatus for measuring directional rainfall or snow incorporating variables of a drainage basin including slope of topography and vertical barriers and direction of wind vector all of which are calibrated to said drainage basin comprising an angular collection unit having a main angle and a secondary angle both of which are fixed to represent slope of topography of said drainage basin, a vertical capture plate adjusted at a height representing vertical barriers of said drainage basin and said vertical capture plate is attached to said angular collection unit where said main angle and secondary angle meet, a positioning unit which positions said angular collection unit in the direction of wind and said positioning unit includes a pair of stabilizers, a rotational connector which is attached to said angular collection unit, a measurement unit which is connected to said angular collection unit using said rotational connector, and a containment and discharge unit which is connected to said measurement unit.

* * * * *